United States Patent
Hensel

(10) Patent No.: US 9,222,577 B2
(45) Date of Patent: Dec. 29, 2015

(54) SHIFT LINKAGE ASSEMBLY FOR TRANSMISSION

(71) Applicant: GM Global Technology Operations LLC, Detroit, MI (US)

(72) Inventor: Barry Hensel, Canton, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 284 days.

(21) Appl. No.: 14/022,929

(22) Filed: Sep. 10, 2013

(65) Prior Publication Data

US 2015/0068339 A1    Mar. 12, 2015

(51) Int. Cl.
*F16H 61/02* (2006.01)
*F16H 61/68* (2006.01)
*F16H 63/02* (2006.01)

(52) U.S. Cl.
CPC ............ *F16H 61/0293* (2013.01); *F16H 61/68* (2013.01); *F16H 63/02* (2013.01)

(58) Field of Classification Search
CPC ......... F16H 21/00; F16H 51/00; F16H 51/02; F16H 61/26; F16H 61/68; F16H 61/0293; F16H 61/0297; F16H 63/00; F16H 63/005; F16H 63/02; F16H 63/04; F16H 2704/04

USPC ....................... 74/335, 473.1, 473.3; 180/336
See application file for complete search history.

(56) References Cited

U.S. PATENT DOCUMENTS

| RE26,633 E | * | 7/1969 | Musgrave ........................ 74/375 |
| 5,145,469 A | * | 9/1992 | Lasoen .......................... 475/209 |
| 7,494,441 B2 | * | 2/2009 | Haefner ........................ 475/331 |
| 8,128,443 B2 | * | 3/2012 | Gai et al. ........................ 440/86 |
| 2004/0016314 A1 | * | 1/2004 | Satoh et al. .................. 74/473.3 |

FOREIGN PATENT DOCUMENTS

DE    102011087332    *    5/2013
GB    938467    *    10/1963

OTHER PUBLICATIONS

English Translation of DE 102011087332.*

* cited by examiner

*Primary Examiner* — William Kelleher
*Assistant Examiner* — Thomas Magnuson

(57) ABSTRACT

A shift rod assembly for a transmission of a vehicle having a pair of shift rod members, a gear set assembly, and a pair of link members. The shift rod members each have a splined portion formed in the outer surface that mesh with a gear of the gear set assembly to translate rotational movement from one shift rod member to the other. The link members connect the shift rods to translate axial movement from one shift rod member to the other.

28 Claims, 5 Drawing Sheets

SHIFT LINKAGE ASSEMBLY FOR TRANSMISSION

FIELD

The present disclosure relates to a mechanical shift linkage assembly for a transmission, and more particularly to a mechanical shift rod assembly linkage between a stick shift gear selector and a manual transmission.

BACKGROUND

The statements in this section merely provide background information related to the present disclosure and may or may not constitute prior art.

Some vehicle powertrains are designed to include a front mounted engine with a transmission located near the rear axle. For manual transmission applications, this design requires a linkage or connection between the driver controlled gear stick shift and the transmission. Additionally, the connection point of the stick shift and the transmission were offline or simply not a straight connection. In the past, a non-straight linkage or shift rod was utilized to transfer rotational and translational movement from the stick shift to the transmission. The shift rod was designed to compensate for the non-aligning connection with a twisted design requiring u-joints. While this worked well for its intended purpose, there are several shortcomings associated with the shift rod design. For example, the shift rod tended to twist upon itself instead of translating the rotational motion to the transmission. The torsional flexibility in the shift rod leads to increased shift effort for the driver and longer shift time. Therefore, there is room in the art for improved gear set shifter connection that reduce shift time, driver shift effort, and improved shift quality that translates into a better driving experience.

SUMMARY

The present invention provides a shift linkage assembly for a transmission of a vehicle. The shift linkage assembly includes a first and a second shift linkage member, a gear set assembly, and a first and second axial movement link member. Each shift linkage member has a first end and a second end opposite the first end, and a first radial channel formed proximate the second end. The first end of the first shift linkage member is fixed to a gear selection lever for common rotational and axial movement and the first end of the second shift linkage member is fixed to a transmission gear selection mechanism for common rotational and axial movement. The gear set assembly has a first, a second, and a third gear, and a housing. The housing rotatably supports the shift linkage members proximate the second end. The third gear is rotatably supported by the housing and is disposed in a meshing relationship with the first and second gears. The first gear is engaged for common rotation with the first shift linkage member and the second gear is engaged for common rotation with the second shift linkage member. Each of the first and second axial movement link members have at least a first bore. The first link member is disposed in the first radial channel of the first shift linkage member. The first link member is configured to engage the second end of the second shift linkage member the second link member is disposed in the first radial channel of the second shift linkage member. The second link member is configured to engage the second end of the first link member. The shift linkage members are rotatable relative to the link members.

In another example of the present invention, each of the shift linkage members have a second radial channel formed at the second end of the shift linkage members on an opposite side of the splined portion from the first radial channel.

In yet another example of the present invention, each of the link members have an elongated flat shape, the first bore is disposed proximate a first end of the link members, a second bore is disposed proximate a second end of the link member, the first link member is further disposed such that the second bore of the first link member is in the second radial channel of the second shift linkage member, and the second link member is further disposed such that the second bore of the second link member is in the second radial channel of the first shift linkage member.

In yet another example of the present invention, each of the shift linkage members have an axial bore disposed in the second end.

In yet another example of the present invention, each of the link members have an elongated flat shape, the first bore is disposed proximate a first end of the link members, a boss is disposed proximate a second end of the link member, the first link member is further disposed such that the boss of the first link member is disposed in the bore of the second shift linkage member, and the second link member is further disposed such that the boss of the second link member is disposed in the bore of the first shift linkage member.

In yet another example of the present invention, the housing of the gear set assembly is grounded to the vehicle.

In yet another example of the present invention, the housing of the gear set assembly is fixed to a torque tube of the vehicle.

In yet another example of the present invention, the shift linkage members are axially straight.

In yet another example of the present invention, a rotation of the first shift linkage results in a single rotation of the second shift linkage.

In yet another example of the present invention, a rotation of the first shift linkage results in less than one rotation of the second shift linkage.

In yet another example of the present invention, a single rotation of the first shift linkage results in more than one rotation of the second shift linkage.

In yet another example of the present invention, the first and second linkage members include a splined portion formed in an outer surface of the shift rod members between the first radial channel and the second end.

In yet another example of the present invention, each of the first and second gears include a splined inner surface that is meshed with the splined portions of each of the first and second linkage members.

Further features and advantages of the present disclosure will become apparent by reference to the following description and appended drawings wherein like reference numbers refer to the same component, element or feature.

DRAWINGS

The drawings described herein are for illustration purposes only and are not intended to limit the scope of the present disclosure in any way;

DETAILED DESCRIPTION

The following description is merely exemplary in nature and is not intended to limit the present disclosure, application, or uses.

Figure 1:
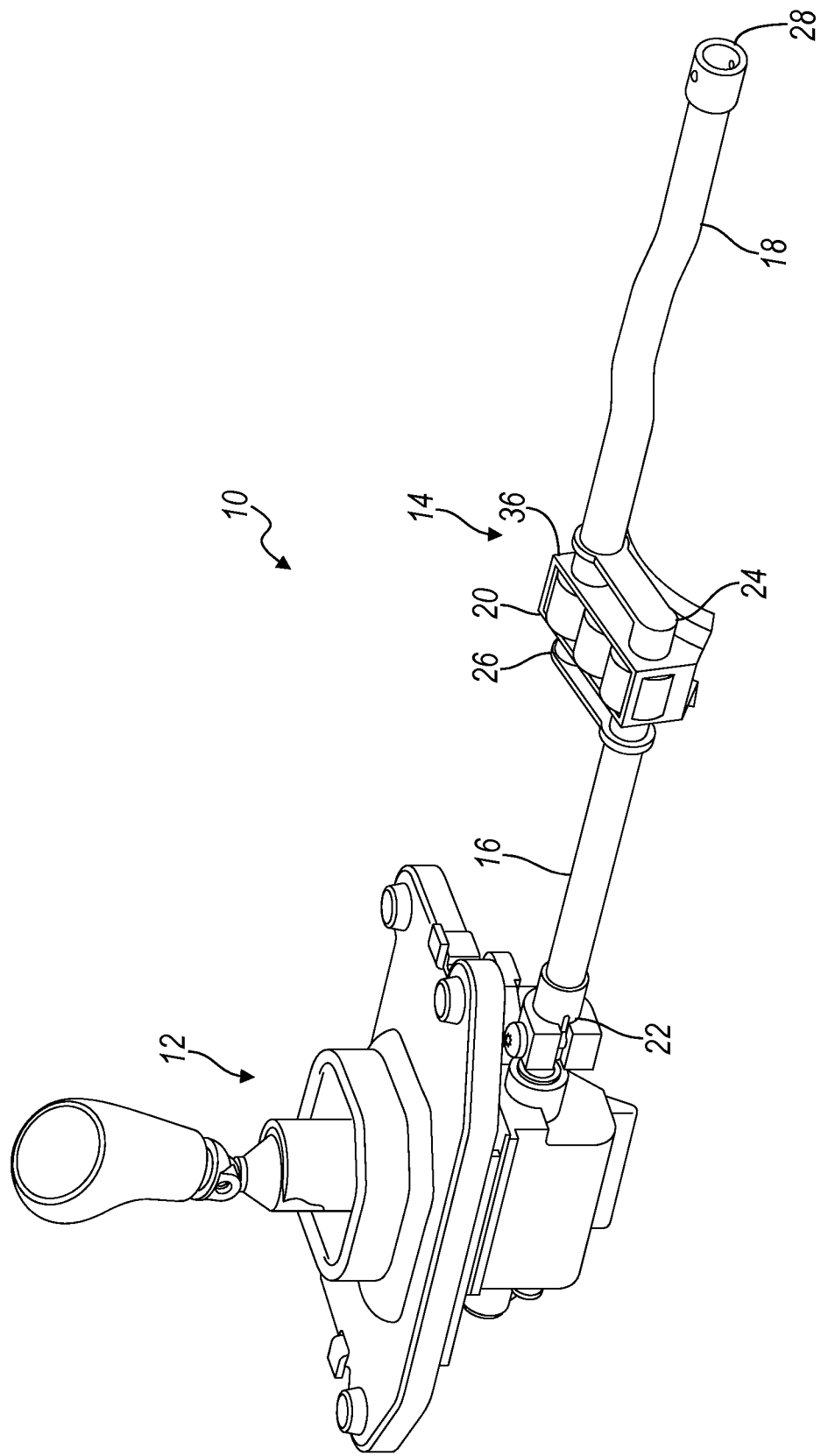
FIG. 1 is an illustration of a manual transmission gear shift and shift linkage assembly according to the present disclosure.

With reference to FIG. 1, an exemplary transmission gear shift selector assembly is generally indicated by reference number 10. The gear shift selector assembly 10 establishes a mechanical connection between a driver of the vehicle and a transmission gear selector (not shown). The gear shift selector assembly includes a gear selector lever or stick 12 and a shift linkage assembly 14. More specifically, the shift linkage assembly 14 mechanically connects the gear selector lever 12 to the transmission gear selector and transfers rotational and translational motion from the gear selector lever or suck 12 to the transmission gear selector. The shift linkage assembly 14 includes a first and a second linkage member or rod 16, 18, a first and a second axial movement members or links 38, 40, and a gear set assembly 20. The first linkage member 16 has a first end 22 and a second end 24 opposite the first end 22. The first end 22 is connected for common rotational movement and common axial translational movement with the gear selector lever 12. The second end 24 is engaged with the gear set assembly 20. The second linkage member 18 includes a first end 26 and a second end 28 opposite the first end 26. The first end 26 is connected for common rotational movement and common axial translational movement with the transmission gear selector. The second end 28 is engaged with the gear set assembly 20.

Figure 2:
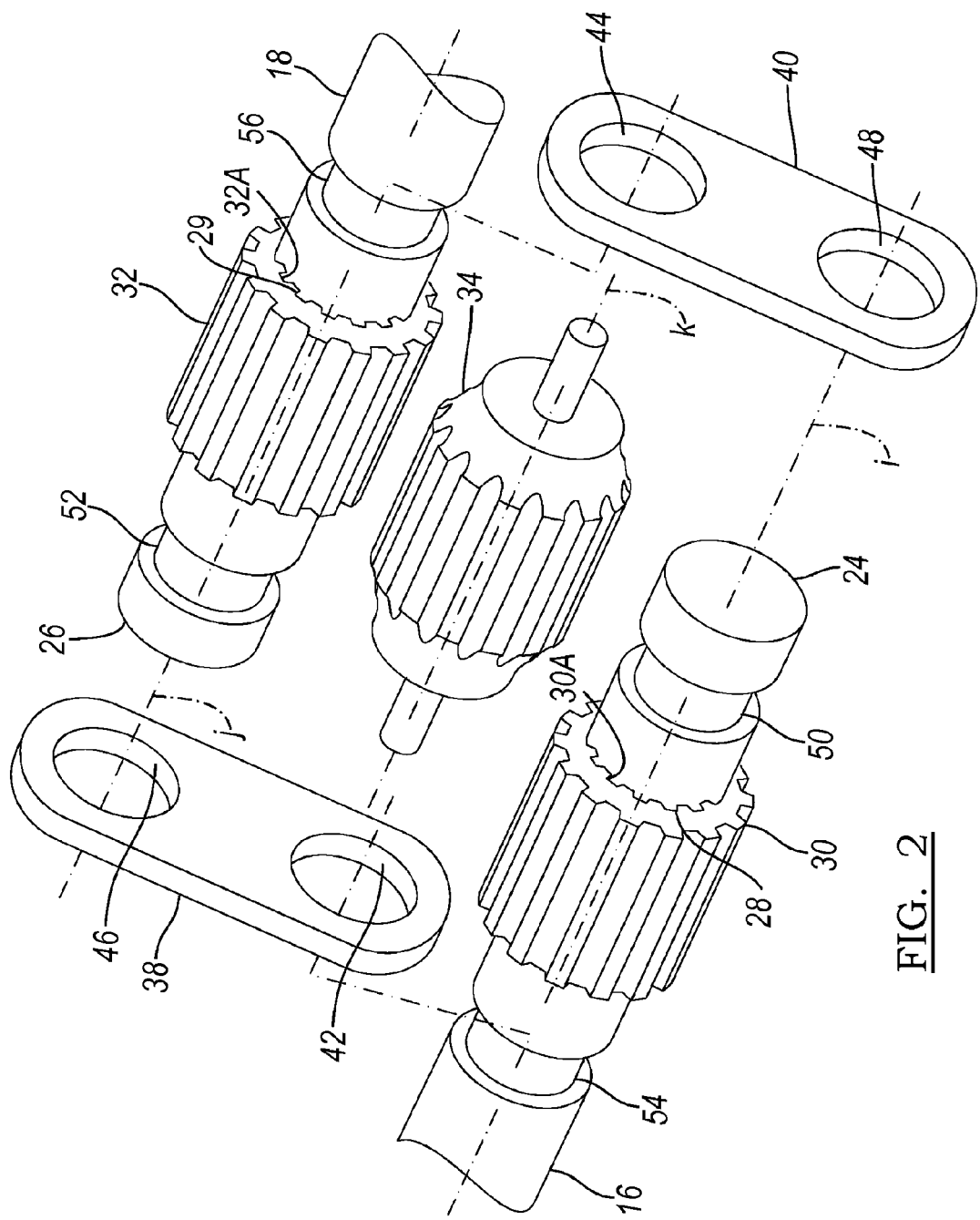
FIG. 2 is an illustration of a shift linkage assembly according to the present disclosure.

Referring now to FIG. 2, another example of the gear set assembly 20 and linkage members 16, 18 is illustrated and will now be described. Each of the linkage members 16, 18 further include a first radial groove or channel 50, 52 proximate the second end 24, 26 of the linkage members 16, 18, a splined portion 28, 29 formed into the outer surface of the linkage members adjacent to the first radial groove or channel 50, 52, and a second radial groove or channel 54, 56 disposed on the opposite side of the splined portion 28, 29 from the first groove or channel 50, 52. The gear set assembly 20 includes a first gear 30, a second gear 32, a third gear 34, and a housing or mount 36 (shown in FIG. 1). The third gear 34 is rotationally supported by the housing 36 and rotates about an axis k that is parallel to axis i, j of the first and second linkage members 16, 18. The first gear 30 includes an inner splined surface 30A that is disposed on the splined portion 28 of the first linkage member 16 so that inner splined surface 30A of the gear 30 meshes for common rotation with the splined portion 28 of the first linkage member 16. The second gear 32 includes an inner splined surface 32A that is disposed on the splined portion 29 of the second linkage member 18 so that inner splined surface 32A of the gear 32 meshes for common rotation with the splined portion 29 of the second linkage member 18. The gear 34 meshes with each of the first gear 30 and the second gear 32. The linkage members 16, 18 are capable of axial translation or movement with respect to the first and second gears 30, 32 while still keeping in common rotational movement of the gears 30, 32. In this example, the gears 30, 32, 34 are spur gears, however, other types of gears can be used without departing from the scope of the invention.

The first and second axial movement links 38, 40 are elongated flat members each having a first and a second bore 42, 44, 46, 48 disposed symmetrically in the links 38, 40. The links 38, 40 are disposed on the linkage members 16, 18. The linkage members 16, 18 pass through the bores 42, 44, 46, 48 of the links 38, 40 such that the links 38, 40 are captured by or disposed in the radial channels 50, 52, 54, 56 so that the linkage members 16, 18 rotate freely with respect to the links 38, 40 and translate axial movement from the first linkage member 16 to the second linkage member 18.

Figure 3A:
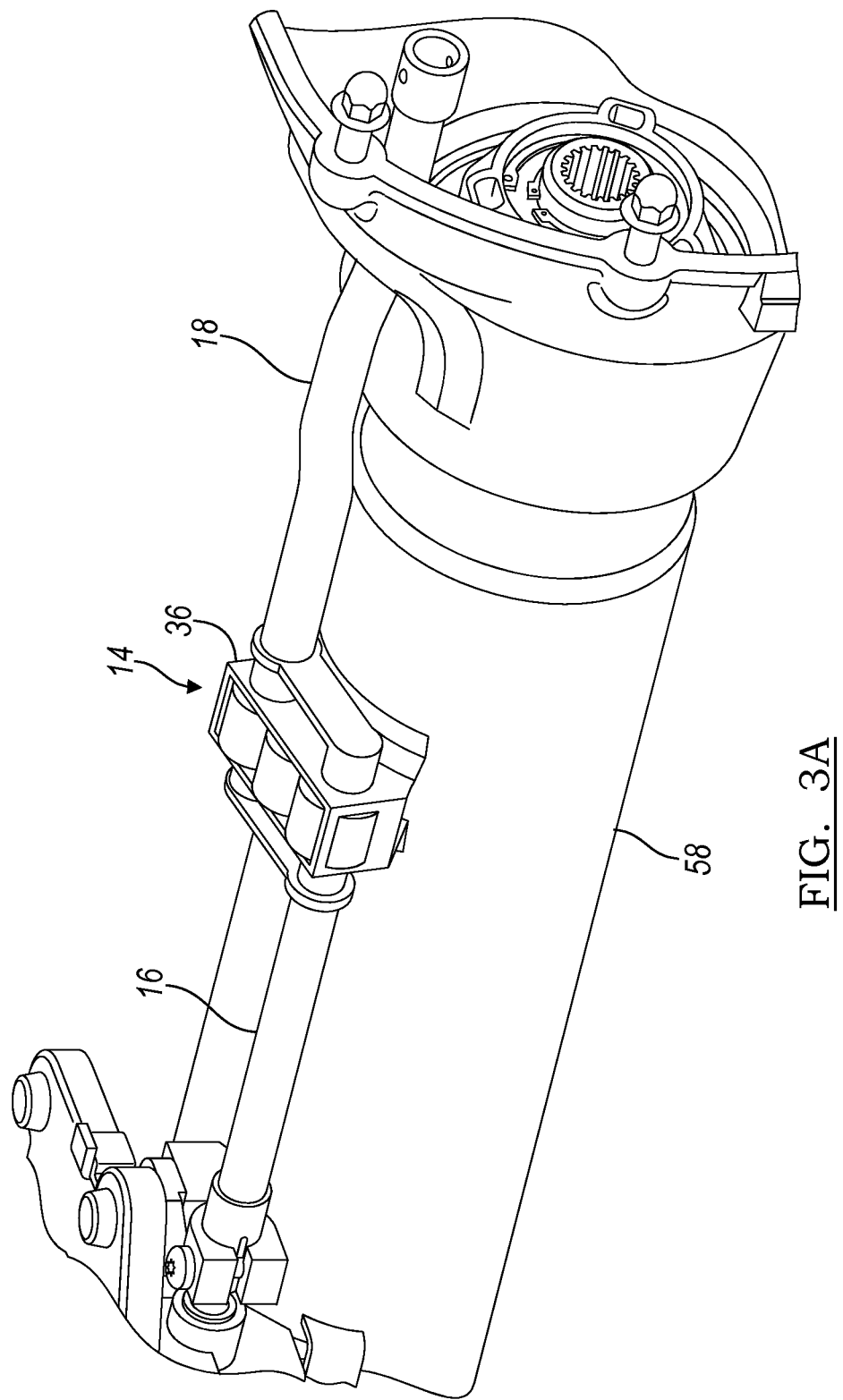
FIG. 3A is an illustration of a shift linkage assembly installed on a powertrain torque tube according the present disclosure.
Figure 3B:
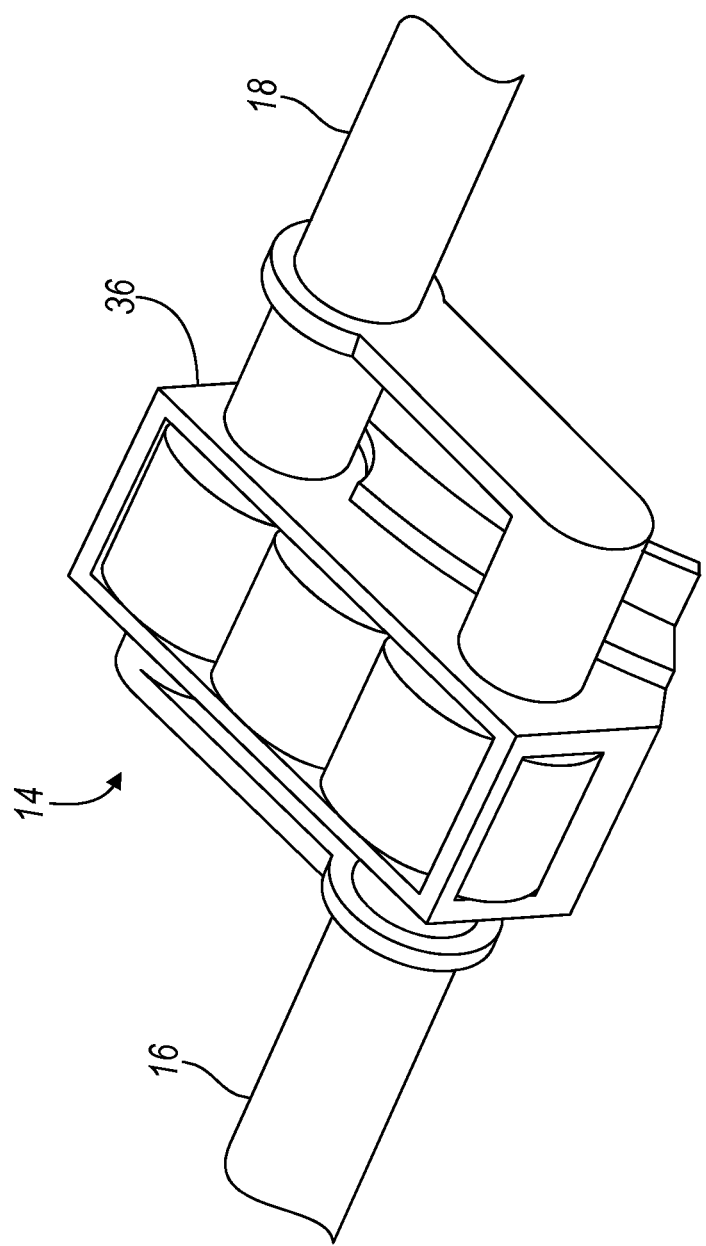
FIG. 3B is an illustration of a gear set portion of a shift linkage assembly according the present disclosure.

Referring now to FIGS. 3A and 3B, another example of the shift linkage assembly 14 is illustrated and will now be described. In the assembled state, FIG. 3A shows the linkage members 16, 18 rotationally supported by the housing 36. Furthermore, the housing is grounded or fixed to a torque tube 58 that provides a housing through which passes the drive shaft from the engine (not shown) to the transmission (not shown). FIG. 3A also displays the shift linkage assembly 14 in an axially neutral position. Referring to FIG. 3B, the shift linkage assembly 14 is shown in an axially shifted or non-neutral position.

Figure 4:
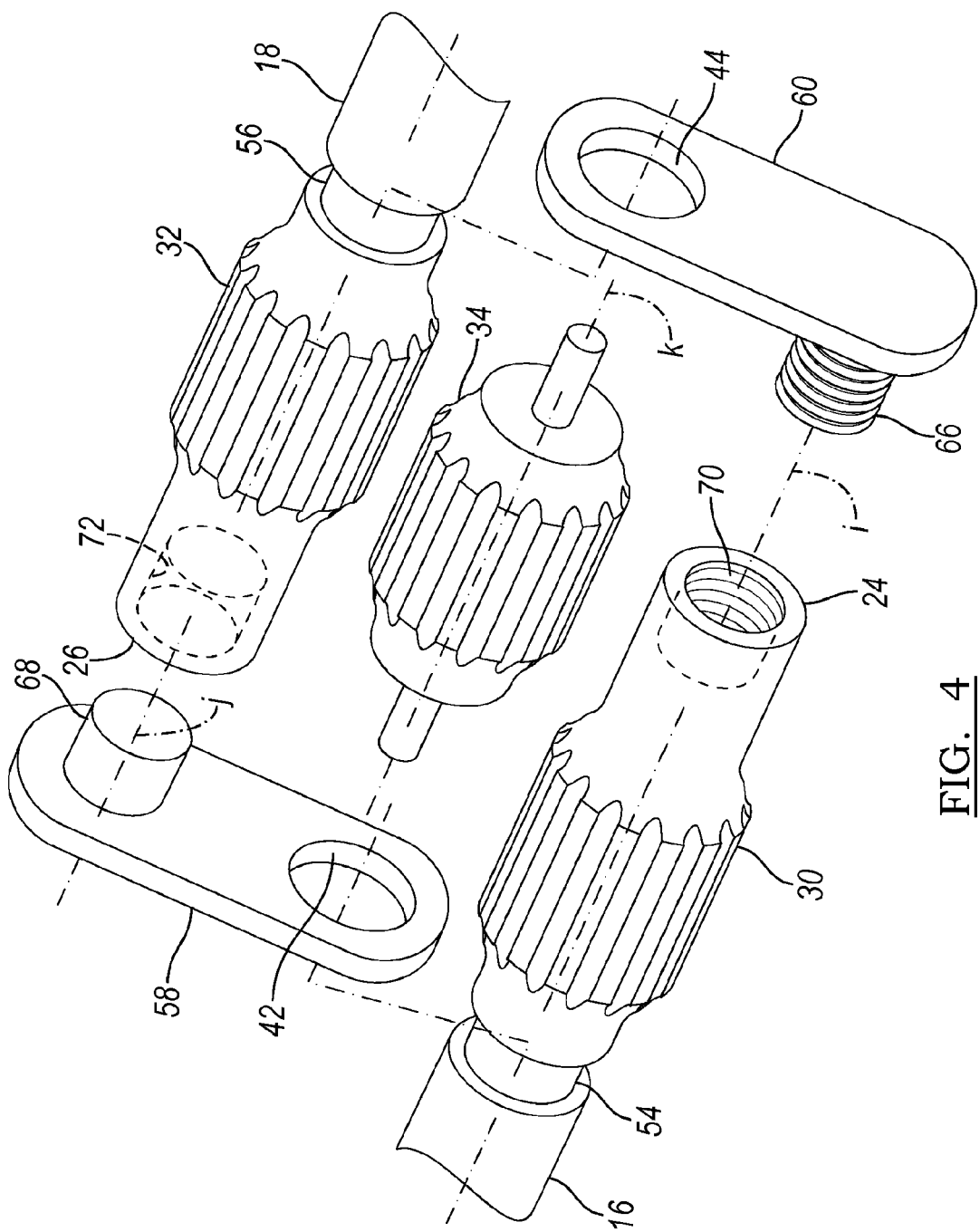
FIG. 4 is an illustration of a gear set portion of a shift linkage assembly according the present disclosure.

Referring now to FIG. 4, another example of the shift linkage assembly 10 is illustrated and will now be described with reference numbers from FIGS. 1-3B carried-over for similar elements. In particular, the shift linkage assembly 14 includes a first and second axial movement links 58, 60 are elongated flat members each having a bore 62, 64 and a cylindrical extension portion 66, 68. The links 58, 60 are disposed on the linkage members 16, 18. For example, each linkage member includes a bore 70, 72 disposed in the second end 24, 26 of the linkage members 16, 18, and a radial groove or channel 54, 56 disposed on the opposite side of the splined portion 30, 32 formed on the outer surface of the linkage members 16, 18. The linkage members 16, 18 pass through the bores 62, 64 of the links 38, 40 such that the links 58, 60 are captured by or disposed in the radial channels 54, 56. The extension portion 66, 68 of the links 38, 40 are disposed in the bores 70, 72 of the linkage members 16, 18 so that the linkage member 16, 18 rotate freely with respect to the links 58, 60 and translate axial movement from the first linkage member 16 to the second linkage member 18.

The description of the disclosure is merely exemplary in nature and variations that do not depart from the gist of the disclosure are intended to be within the scope of the disclosure. Such variations are not to be regarded as a departure from the spirit and scope of the disclosure.

What is claimed is:

1. A shift linkage assembly for a transmission of a vehicle, the shift linkage assembly including:

a first and a second shift linkage member, each shift linkage member having a first end and a second end opposite the first end, and a first radial channel formed proximate the second end, and wherein the first end of the first shift linkage member is fixed to a gear selection lever for common rotational and axial movement and the first end of the second shift linkage member is fixed to a transmission gear selection mechanism for common rotational and axial movement;

a gear set assembly having a first, a second, and a third gear, and a housing, and wherein the housing rotatably supports the shift linkage members proximate the second end, the third gear is rotatably supported by the housing and is disposed in a meshing relationship with the first and second gears, the first gear is engaged for common rotation with the first shift linkage member and the second gear is engaged for common rotation with the second shift linkage member, and a first and a second axial movement link member, each of the link members having at least a first bore, and wherein the first link member is disposed in the first radial channel of the first shift linkage member, the first link member is configured to engage the second end of the second shift linkage member the second link member is disposed in the first radial channel of the second shift linkage member, the second link member is configured to engage the second end of the first link member, and the shift linkage members are rotatable relative to the link members.

2. The shift linkage assembly of claim 1 wherein each of the shift linkage members have a second radial channel formed at the second end of the shift linkage members on an opposite side of a splined portion from the first radial channel.

3. The shift linkage assembly of claim 2 wherein each of the link members have an elongated flat shape, the first bore is disposed proximate a first end of the link members, a second bore is disposed proximate a second end of the link member, the first link member is further disposed such that the second bore of the first link member is in the second radial channel of the second shift linkage member, and the second link member is further disposed such that the second bore of the second link member is in the second radial channel of the first shift linkage member.

4. The shift linkage assembly of claim 1 wherein each of the shift linkage members have an axial bore disposed in the second end.

5. The shift linkage assembly of claim 4 wherein each of the link members have an elongated flat shape, the first bore is disposed proximate a first end of the link members, a boss is disposed proximate a second end of the link members, the first link member is further disposed such that the boss of the first link member is disposed in the bore of the second shift linkage member, and the second link member is further disposed such that the boss of the second link member is disposed in the bore of the first shift linkage member.

6. The shift linkage assembly of claim 1 wherein the housing of the gear set assembly is grounded to a vehicle.

7. The shift linkage assembly of claim 1 wherein the housing of the gear set assembly is fixed to a torque tube of a vehicle.

8. The shift linkage assembly of claim 1 wherein the shift linkage members are axially straight.

9. The shift linkage assembly of claim 1 wherein one rotation of the first shift linkage results in one rotation of the second shift linkage.

10. The shift linkage assembly of claim 1 wherein one rotation of the first shift linkage results in less than one rotation of the second shift linkage.

11. The shift linkage assembly of claim 1 wherein one rotation of the first shift linkage results in more than one rotation of the second shift linkage.

12. The shift linkage assembly of claim 1 wherein the first and second linkage members include a splined portion formed in an outer surface of the linkage members between the first radial channel and the second end.

13. The shift linkage assembly of claim 12 wherein each of the first and second gears include a splined inner surface that is meshed with the splined portions of each of the first and second linkage members.

14. A shift linkage assembly for a transmission of a vehicle, the shift linkage assembly including:
a first and a second shift linkage member, each shift linkage member having a first end and a second end opposite the first end, and a first radial channel formed proximate the second end, and wherein each of the shift linkage members are axially straight, the first end of the first shift linkage member is fixed to a gear selection lever for common rotational and axial movement and the first end of the second shift linkage member is fixed to a transmission gear selection mechanism for common rotational and axial movement;
a gear set assembly having a first, a second, and a third gear, and a housing, and wherein the housing is grounded to a vehicle and rotatably supports the shift linkage members proximate the second end, the third gear is rotatably supported by the housing and is disposed in a meshing relationship with the first and second gears, the first gear is engaged for common rotation with the first shift linkage member and the second gear is engaged for common rotation with the second shift linkage member, and
a first and a second axial movement link member, each of the link members having an elongated flat shape and at least a first bore, and wherein the first link member is disposed in the first radial channel of the first shift linkage member, the first link member is configured to engage the second end of the second shift linkage member the second link member is disposed in the first radial channel of the second shift linkage member, the second link member is configured to engage the second end of the first link member, and the shift linkage members are rotatable relative to the link members.

15. The shift linkage assembly of claim 14 wherein each of the shift linkage members have a second radial channel formed at the second end of the shift linkage members on an opposite side of a splined portion from the first radial channel.

16. The shift linkage assembly of claim 15 wherein the first bore of each link member is disposed proximate a first end of the link members, a second bore is disposed proximate a second end of the link members, the first link member is further disposed such that the second bore of the first link member is in the second radial channel of the second shift linkage member, and the second link member is further disposed such that the second bore of the second link member is in the second radial channel of the first shift linkage member.

17. The shift linkage assembly of claim 14 wherein each of the shift linkage members have an axial bore disposed in the second end.

18. The shift linkage assembly of claim 17 wherein the first bore of each link member is disposed proximate a first end of the link members, a boss is disposed proximate a second end of the link member, the first link member is further disposed such that the boss of the first link member is disposed in the bore of the second shift linkage member, and the second link member is further disposed such that the boss of the second link member is disposed in the bore of the first shift linkage member.

19. The shift linkage assembly of claim 14 wherein the housing of the gear set assembly is fixed to a torque tube of a vehicle.

20. The shift linkage assembly of claim 14 wherein a gear ratio between the first gear and the second gear is 1 to 1.

21. The shift linkage assembly of claim 14 wherein a gear ratio between the first gear and the second gear is greater or less than 1 to 1.

22. The shift linkage assembly of claim 14 wherein the first and second linkage members include a splined portion formed in an outer surface of the linkage members between the first radial channel and the second end.

23. The shift linkage assembly of claim 22 wherein each of the first and second gears include a splined inner surface that is meshed with the splined portions of each of the first and second linkage members.

24. A shift linkage assembly for a transmission of a vehicle, the shift linkage assembly including:
- a first and a second shift linkage member, each shift linkage member having a first end and a second end opposite the first end, a first radial channel formed proximate the second end, and a splined portion formed in an outer surface of the shift rod members between the first radial channel and the second end, and wherein each of the shift linkage members are axially straight, the first end of the first shift linkage member is fixed to a gear selection lever for common rotational and axial movement and the first end of the second shift linkage member is fixed to a transmission gear selection mechanism for common rotational and axial movement;
- a gear set assembly having a first, a second, and a third gear, and a housing, and wherein the housing is grounded to a vehicle and rotatably supports the shift linkage members proximate the second end, the third gear is rotatably supported by the housing and is disposed in a meshing relationship with the first and second gears, each of the first and second gears include a splined inner surface that is meshed with the splined portions of each of the first and second linkage members, and
- a first and a second axial movement link member, each of the link members having an elongated flat shape and at least a first bore, and wherein the first link member is disposed in the first radial channel of the first shift linkage member, the first link member is configured to engage the second end of the second shift linkage member the second link member is disposed in the first radial channel of the second shift linkage member, the second link member is configured to engage the second end of the first link member, and the shift linkage members are rotatable relative to the link members.

25. The shift linkage assembly of claim 24 wherein each of the shift linkage members have a second radial channel formed at the second end of the shift linkage members on an opposite side of the splined portion from the first radial channel.

26. The shift linkage assembly of claim 25 wherein the first bore of each link member is disposed proximate a first end of the link members, a second bore is disposed proximate a second end of the link members, the first link member is further disposed such that the second bore of the first link member is in the second radial channel of the second shift linkage member, and the second link member is further disposed such that the second bore of the second link member is in the second radial channel of the first shift linkage member.

27. The shift linkage assembly of claim 24 wherein each of the shift linkage members have an axial bore disposed in the second end.

28. The shift linkage assembly of claim 27 wherein the first bore of each link member is disposed proximate a first end of the link members, a boss is disposed proximate a second end of the link members, the first link member is further disposed such that the boss of the first link member is disposed in the bore of the second shift linkage member, and the second link member is further disposed such that the boss of the second link member is disposed in the bore of the first shift linkage member.

* * * * *